(12) United States Patent
Yang

(10) Patent No.: US 11,956,375 B2
(45) Date of Patent: Apr. 9, 2024

(54) DIGITAL LETTER OF APPROVAL (DLOA) FOR DEVICE COMPLIANCE

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 17/063,670

(22) Filed: Oct. 5, 2020

(65) Prior Publication Data

US 2021/0021433 A1 Jan. 21, 2021

Related U.S. Application Data

(62) Division of application No. 15/940,786, filed on Mar. 29, 2018, now Pat. No. 10,797,889.

(Continued)

(51) Int. Cl.
*H04L 29/06* (2006.01)
*G06F 16/955* (2019.01)
(Continued)

(52) U.S. Cl.
CPC .......... *H04L 9/3263* (2013.01); *G06F 16/955* (2019.01); *H04L 9/006* (2013.01);
(Continued)

(58) Field of Classification Search
CPC . H04L 9/3263; H04L 9/3247; H04L 63/0853; H04L 63/0823; H04L 9/006; H04L 9/3268; H04L 9/3271; G06F 16/955; H04W 12/00; H04W 12/06; H04W 12/0023; H04W 12/60; H04W 12/35
See application file for complete search history.

(56) References Cited

U.S. PATENT DOCUMENTS

2014/0004827 A1 1/2014 O'Leary
2014/0219447 A1* 8/2014 Park .................. H04W 12/35
380/247

(Continued)

OTHER PUBLICATIONS

"RSP Technical Specification, Version 2.0", GSM Association, Oct. 14, 2016 (Year: 2016).*

(Continued)

*Primary Examiner* — Yogesh Paliwal
(74) *Attorney, Agent, or Firm* — DICKINSON WRIGHT RLLP

(57) ABSTRACT

A digital letter of approval (DLOA) is used by a subscription manager (SM) server to determine whether a device is compliant with requirements for an application to be provisioned. If the device is compliant, the application is provisioned to the device or to an embedded universal integrated circuit card (eUICC) included in the device. To increase the security of the device DLOA, the device DLOA is linked to the eUICC, in some embodiments. The linkage may be based on one or more platform label fields in the device DLOA. A database is consulted, in some embodiments, to confirm a relationship between the device and the eUICC identified in the device DLOA. In some embodiments, the eUICC signs the device DLOA and the device DLOA with eUICC signature is sent to the SM server. In some embodiments, the device provides a device signature on the DLOA independent of the eUICC.

18 Claims, 14 Drawing Sheets

Related U.S. Application Data

(60) Provisional application No. 62/482,143, filed on Apr. 5, 2017.

(51) Int. Cl.
　　　*H04L 9/00*　　　(2022.01)
　　　*H04L 9/32*　　　(2006.01)
　　　*H04W 12/00*　　(2021.01)

(52) U.S. Cl.
　　　CPC .......... *H04L 9/3268* (2013.01); *H04L 9/3271* (2013.01); *H04W 12/00* (2013.01)

(56) References Cited

U.S. PATENT DOCUMENTS

| | | | |
|---|---|---|---|
| 2015/0341791 A1* | 11/2015 | Yang | H04L 9/3234 713/159 |
| 2017/0142121 A1* | 5/2017 | Lee | H04L 67/75 |
| 2017/0338954 A1 | 11/2017 | Yang et al. | |
| 2018/0294976 A1 | 10/2018 | Yang | |

OTHER PUBLICATIONS

Global Platform Card, "Digital Letter of Approval", Version 1.0, Nov. 2015 (Year: 2015).*

Groves, "Elliptic Curve-Based Certificateless Signatures for Identity-Based Encryption (ECCSI)," Internet Engineering Task Force (IETF), CESG, Request for Comments: 6507, Feb. 2012, 17 pages.

"RSP Technical Specification, Version 2.0," GSM Association, Oct. 14, 2016, 229 pages.

"SIM-Based Tokenisation Technical Case Study—France and Poland, Version 1.0," GSM Association, Apr. 19, 2016, 84 pages.

* cited by examiner

DIGITAL LETTER OF APPROVAL (DLOA) FOR DEVICE COMPLIANCE

CROSS-REFERENCE TO RELATED APPLICATIONS

The present application is a divisional of U.S. application Ser. No. 15/940,786, filed Mar. 29, 2018, entitled "DIGITAL LETTER OF APPROVAL (DLOA) FOR DEVICE COMPLIANCE," issued on Oct. 6, 2020 as U.S. Pat. No. 10,797,889, which claims the benefit of U.S. Provisional Application No. 62/482,143, entitled "DIGITAL LETTER OF APPROVAL (DLOA) FOR DEVICE COMPLIANCE," filed Apr. 5, 2017, the contents of all of which are incorporated by reference herein in their entirety for all purposes.

FIELD

Embodiments disclosed herein relate to verifying device compliance with certification needed to deploy an application.

BACKGROUND

A wireless device such as a mobile phone can include an embedded universal integrated circuit card (eUICC) hosting several profiles. Each profile may be associated with a different mobile network operator (MNO). A profile may also be referred to as an electronic subscriber identity module (eSIM). An MNO provides access capability and communication services to subscribers through a mobile network infrastructure. A profile is a combination of operator data and applications, i.e., content, provisioned to an eUICC for providing those services. In this sense, the MNO is the owner or controller of the profiles associated with the MNO. Sometimes an MNO will provision an application to a device using a subscription manager (SM) server. An SM server may be a subscription management data preparation (SMDP, or SM-DP+) server or a subscription manager discovery server (SMDS).

A wireless device can be provisioned with a profile. Various network entities participate in provisioning of an profile to an eUICC hosted by a wireless device. Profile provisioning may also be referred to as eSIM or SIM provisioning herein. One architecture for profile provisioning is called Remote Sim Provisioning (RSP). Details of the RSP Architecture can be found in the "RSP Technical Specification," Version 2.0, Oct. 14, 2016, Official Document SGP.22, GSM Association. The RSP architecture can be used to provision an application to a device or to an eUICC.

Aspects of eSIM provisioning include the downloading, installing, enabling, disabling, switching and deleting of a profile on an eUICC. A profile can contain one or more secure data used to prove identity and thus verify contract rights to services.

A profile can be identified by a unique number called an ICCID (Integrated Circuit Card Identifier). A wireless operator is a company providing wireless cellular network services. In some cases, the wireless device is user equipment used in conjunction with an eUICC to connect to a mobile network. An end user or customer is a person using a (consumer or enterprise) device. An enabled profile can include files and/or applications which are selectable over an eUICC-device interface.

In some instances, a provisioning call flow occurs as follows. A subscriber manager data preparation server (referred to herein as a provisioning server, SM server, SMDP server, SMDP+ server, or eSIM server) and a wireless device establish a transport layer security (TLS) session. The SM server and an eUICC in the device then perform mutual authentication. As part of mutual authentication, the SM server learns an eUICC identifier and the eUICC receives a copy of a server PKI certificate, including an identity of the SM server. The SM server identity, in some embodiments, is an object identifier (OID). The device or eUICC then requests the assistance of the SM server with a provisioning function, for example, a BPP download of an application. The application can be a profile.

A digital letter of approval (DLOA) for an eUICC is issued by an authority and references to it are maintained in a registrar. DLOAs in a banking context are discussed in "SIM-Based Tokenisation Technical Case Study—France and Poland," Version 1.0, Apr. 19, 2016, Official Document NFC.26, GSM Association, GSM Association. A DLOA can be used to certify compliance of an eUICC with RSP requirements. A DLOA can be used to determine whether a given application can be deployed to a particular eUICC.

SUMMARY

Embodiments provided herein describing using a DLOA for checking device compliance with RSP requirements. Compliance is also referred to as eligibility herein. An arbitrary device may not be considered secure for storing sensitive information, such as banking information. Also, a DLOA purporting to qualify a device may be a stolen DLOA being used by a rogue device. In order allow an SM server to verify a DLOA provided by a device, some embodiments provided herein make an association between a device and an eUICC included in the device. In this way, the eUICC provides a root of trust for the device. In some embodiments, a device DLOA is verified without reference to an eUICC.

An SM server may check a device DLOA before completing an application deployment or provisioning to the device or the eUICC included in the device. The SM server may ask the device for its DLOA. In some embodiments, the device DLOA provided by the device to the SM server includes the eUICC/eSE platform label in the device DLOA's platform label field. In some embodiments, the device DLOA includes a new platform label distinct from the device platform label, where the new platform label is the eUICC/eSE's platform label. The inquiring SM server checks a database to determine whether the eUICC/eSE platform label provided with the DLOA can be linked or associated with the device. The database can include a range of device identifiers, such as IMEI values, and associate that range of device identifiers with a range of eUICC identifiers, for example a range of SKU numbers or a range of ICCID values. In some embodiments, the database is provided by a registrar of DLOAs. In some embodiments, the device also attaches to the device DLOA a copy of a public key infrastructure (PKI) certificate of the eUICC before responding to the inquiring SM server.

In some embodiments, an association is made between a device DLOA and an eUICC included in the device by the eUICC signing the device DLOA before responding to the inquiring SM server. A database is used to ensure that the device is indeed linked with the eUICC platform. In an alternative embodiment, the device DLOA already indicates those eUICC identifiers with which it is linked; in this case, a database query is not needed.

In some embodiments, the device provides a root of trust and DLOA verification does not rely on an eUICC root of trust. In some embodiments, the device provides a root of trust using a certificate-based signature and in alternative embodiments the device provides a root of trust using a certificateless signing approach.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

System

Figure 1:
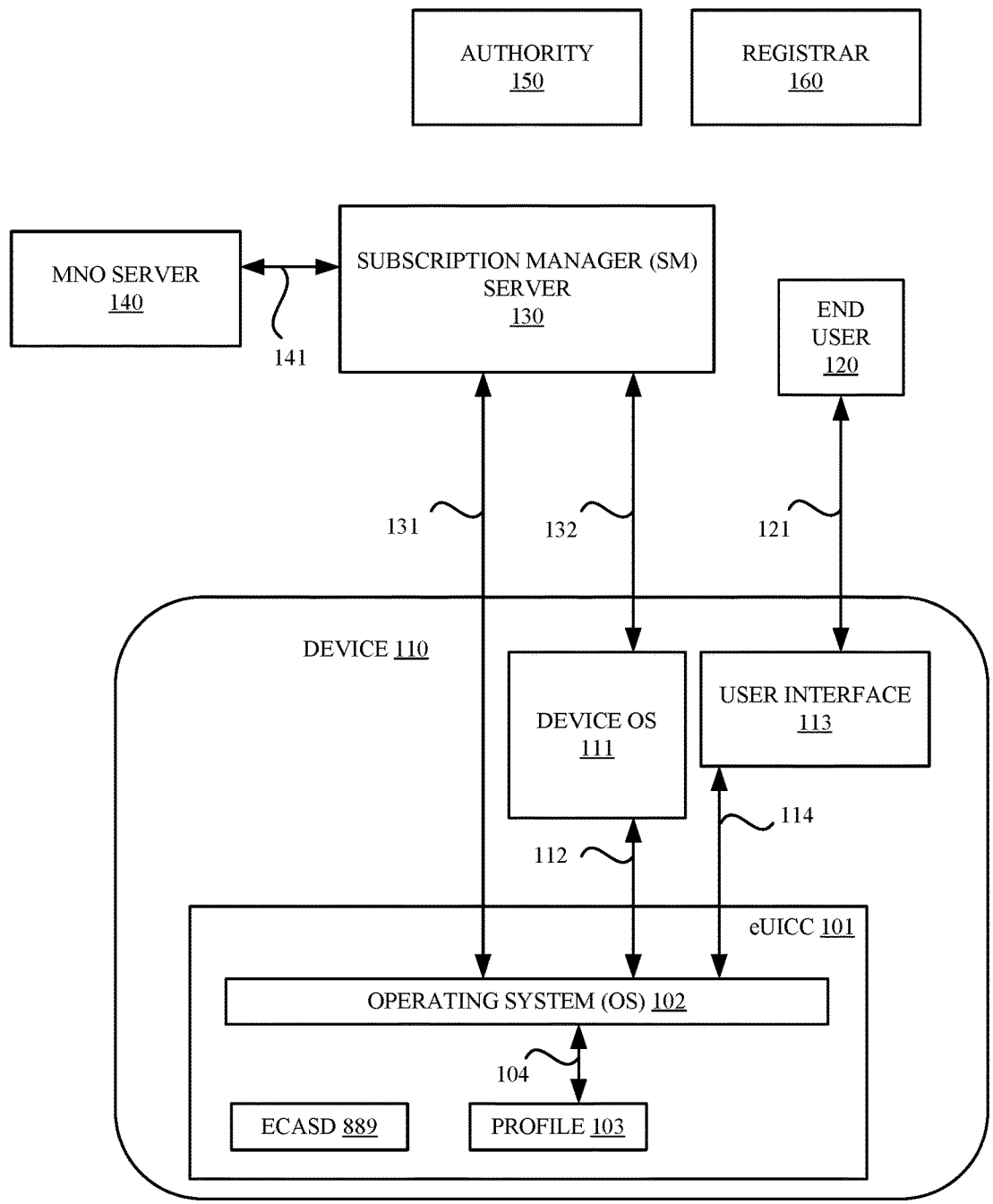
FIG. 1 illustrates an exemplary system useful for implementation, according to some embodiments.

FIG. 1 illustrates an exemplary system 100 including an DLOA authority 150 and a DLOA registrar 160. The system 100 also includes an MNO server 140 connected by a connection 141 to an SM server 130. A device 110 that includes an eUICC 101 is also illustrated. The eUICC 101 may also refer to an eUICC/eSE where eSE indicates embedded secure element. The SM server 130 is connected by connections 131 and 132 to eUICC OS 102 and device OS 111, respectively. An end user 120 may use a device user interface 113 as indicated by 121. The device OS 111 is connected to the eUICC OS by a connection 112. The user interface 113 is connected to the eUICC OS 102 by a connection 114. The eUICC 101 includes an eUICC controlling authority security domain (ECASD) 889 (described below with respect to FIG. 8) and a profile 103. The eUICC OS 102 and the profile 103 interact as indicated by 104.

In embodiments described herein, the SM server 130 verifies compliance of the device 110 with RSP requirements before determining that device 110 is eligible for provisioning of an application to the device 110 (or to the eUICC 101).

Device DLOA, Server Logic

Figure 2:
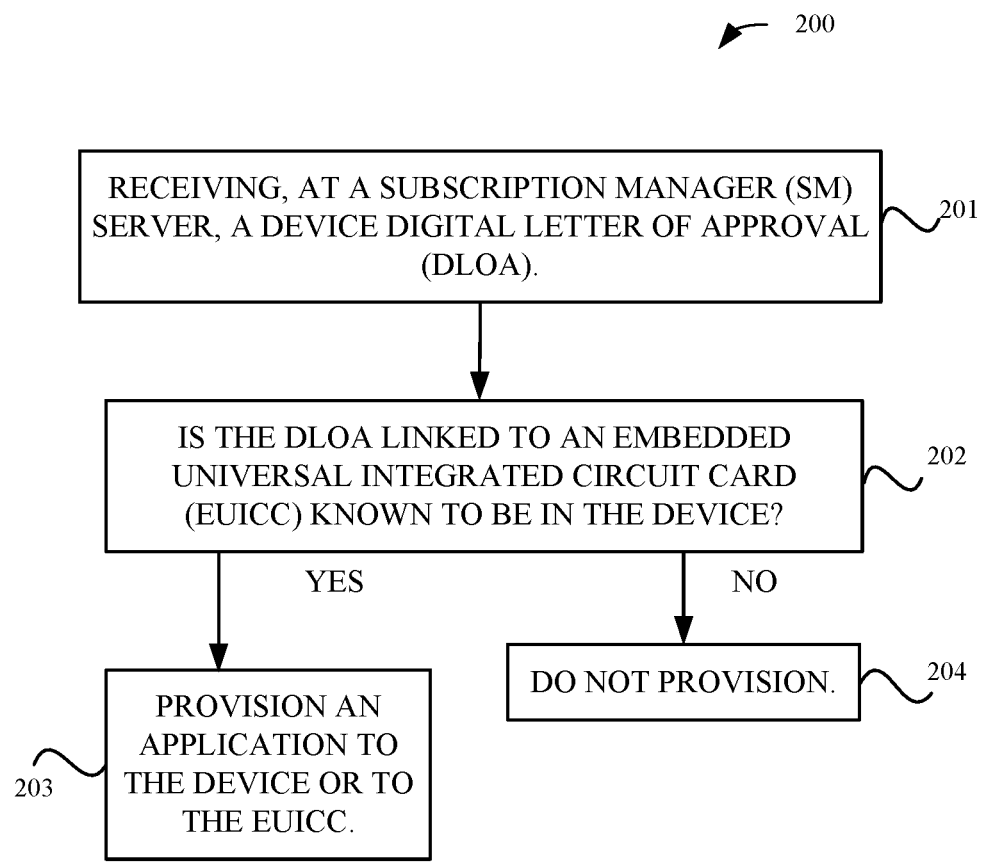
FIG. 2 illustrates exemplary logic for a server checking device compliance (eligibility), according to some embodiments.

FIG. 2 provides exemplary logic 200 for checking device compliance or eligibility. At 201, an SM server receives, from a device, a device DLOA. The DLOA is issued by the authority 150. At 202, the SM server determines whether the DLOA is linked to an eUICC known to be included in the device. This linkage may be checked using a database or information in the DLOA or based on a signature. If the linkage is positively found, the logic flows to 203 and the SM server continues with a provisioning process. If the eUICC is not known to be linked to the device, the logic flows to 204. From 204, an alternative attempt may be made to determine the compliance level of the device with RSP requirements. Depending on a determined compliance level, a second application different that the one indicated in 203, may be provisioned to the device. Or, no application may be provisioned to the device, in some embodiments.

Device DLOA, Message Flows

Figure 3:
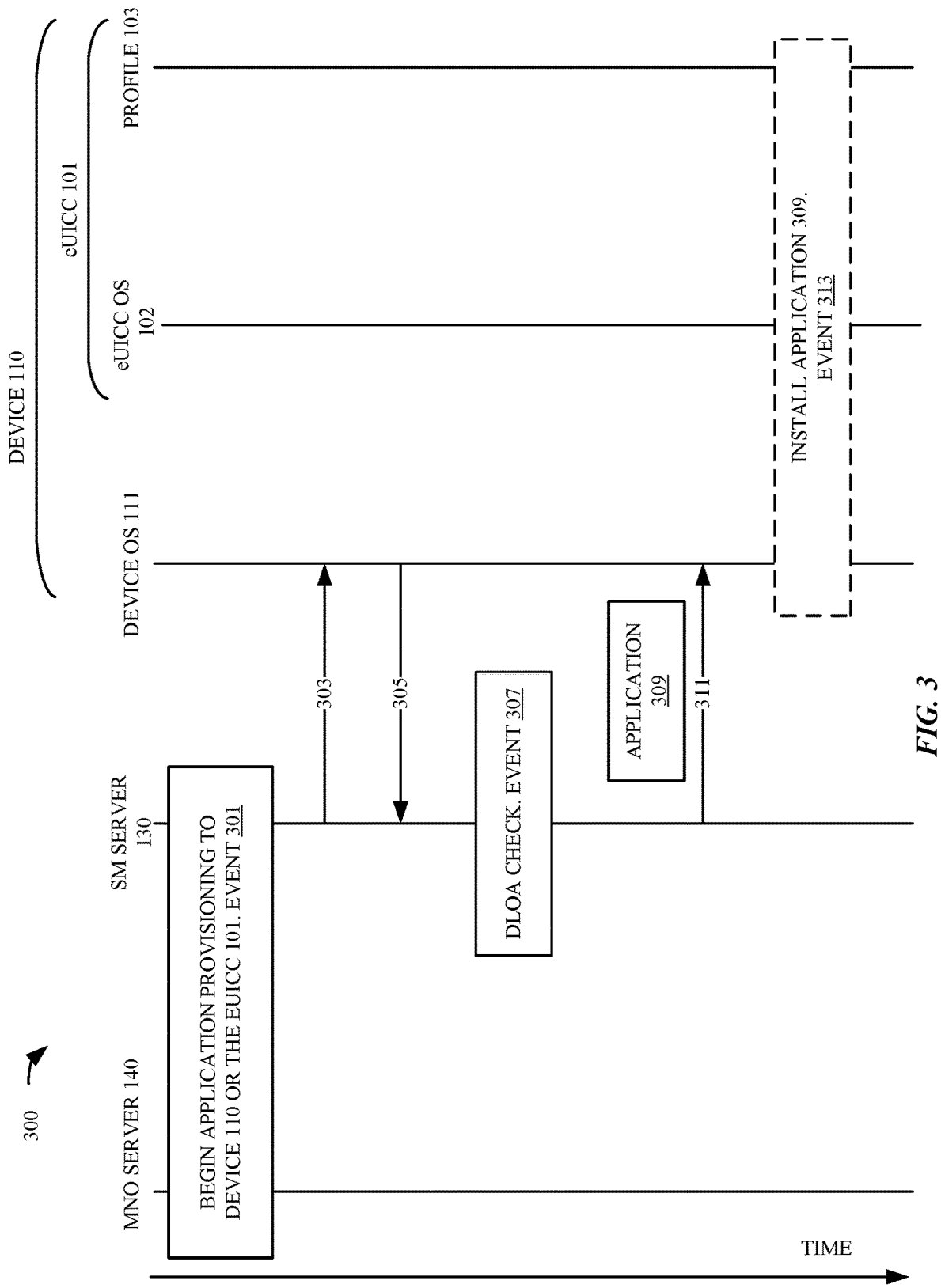
FIG. 3 illustrates an exemplary message flow for checking device eligibility, according to some embodiments.

FIG. 3 illustrates an exemplary message flow 300 for a DLOA check. Across the top of the figure are entity names from FIG. 1. Time advances from top to bottom. Activities at entities are called events and are so labelled. Messages between entities are shown as numbered arrows. The action begins at the upper left with event 301. MNO server 140 may initiate an application provisioning event, or this may be initiated by end user 120, for example. The SM server 130 may request a DLOA from the device 110 as illustrated by message 303. This request may be handled by the device OS 111 as shown in FIG. 3 or alternatively by a local provisioning assistant (LPA) in the device 110 or in the eUICC 101. An LPA 803 is shown in device 110 in FIG. 8; in some embodiments, an LPA is present in the eUICC 101.

The SM server 130 receives a device DLOA via message 305. The device DLOA has fields including a device platform label. The device DLOA, in some embodiments, includes an eUICC platform label field. At event 307, the SM server 130 performs a DLOA check. The DLOA check verifies that the device 110 is linked with the eUICC 101 and determines whether the device 110 satisfies RSP requirements for the application to be provisioned. An eUICC identifier, in some embodiments, is parsed from the device platform label field of the device DLOA. Also, an eUICC identifier, in some embodiments, is parsed from the eUICC platform label field of the device DLOA.

In the scenario depicted in FIG. 3, the device 110 is found by the SM server 130 to be linked with the eUICC 101 (possibly based on consulting a database). Also, the SM server finds by consulting other fields (e.g., an Application_Label field, an Application_AID field, or another field) in the device DLOA that the device 110 is compliant with RSP requirements for the target application. Thus, message 311 illustrates providing the application 309 to the device 110 via a message (or messages) 311. Event 313, marked as a dotted-line box, indicates installation of the application 309 in the device 110 or in the eUICC 101. The application 309, in some embodiments, is associated with the profile 103. The profile 103 is owned and controlled by the MNO associated with the MNO server 140. More than one MNO may provision devices and profiles using the SM server 130.

Figure 4:
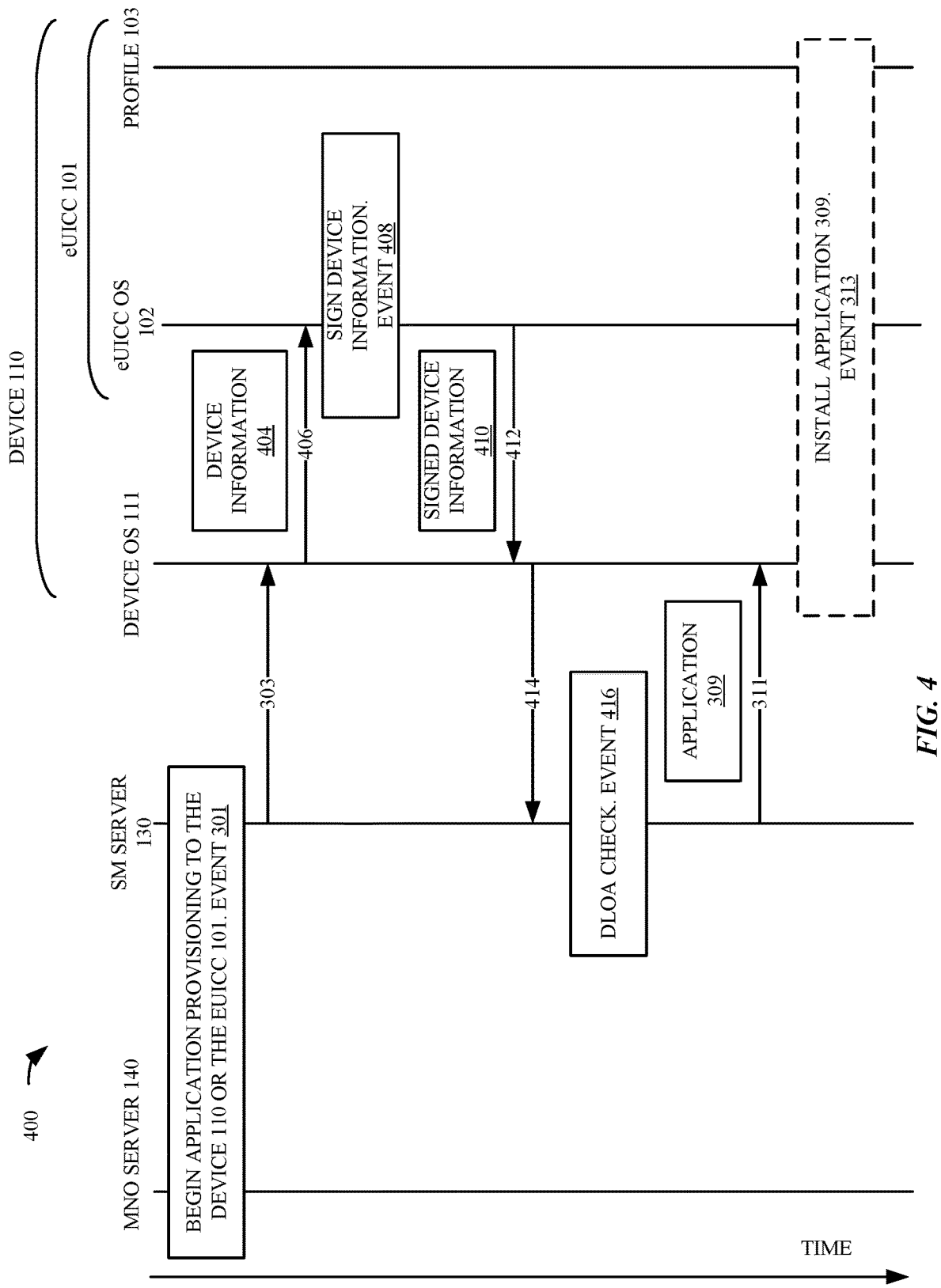
FIG. 4 illustrates an exemplary message flow for checking device eligibility including an eUICC signing event, according to some embodiments.

FIG. 4 illustrates an alternative message flow 400. Message flow 400 includes the same events as message flow 300 except that messages 406, 412, and 414 are added while message 305 is not present in the message flow 400. In the message flow 400, the device DLOA also has platform label fields as for the message flow 300. The SM server 130 requests a device DLOA as in message flow 300. The device 110, using the device OS 111 (or an LPA) provides device information 404 to the eUICC 101 using message 406.

The device information 404, in some embodiments, includes a device DLOA. The device DLOA, in some embodiments, is placed in a DeviceInfo object by the device to create the device information 404 sent to the eUICC. DeviceInfo is an object sent by a device to an eUICC in the device during some RSP authentication procedures. The message 406 carrying device information 404 is not limited to authentication procedures. In some embodiments, the device uses a dedicated application protocol data unit (APDU) to convey device information 404 to eUICC 101 for signing.

At event 408, the eUICC OS 102 signs the device information using a private key of a PKI public key-private key pair associated with the eUICC 101. The private key may be maintained in CASD 889. Message 412 carries the signature or the signed device information 410 to the device OS 111 and the device OS 111 sends the signed device information 414 to the SM server 130.

In some embodiments, not shown in FIG. 4, the device 110 uses a private key to sign the device information 404. For example, a device trusted execution environment (TEE) may possess a PKI public key-private key pair and the public key is known to the SM server 130 in the form of a PKI certificate of the TEE. In this alternative TEE case, the message flow 400 does not include the eUICC 101 and the message flow 400 continues with message 412 carrying the (TEE) signed device information 410.

At 416, the SM server 130 cryptographically verifies that the signature included in the signed device information 410 was created by a private key associated with the eUICC 101 (or by the device 110 in the TEE case). The SM server 130 also verifies that the eUICC 101 is linked to the device 110. The linkage, in some embodiments, is checked using a database. The database, in some embodiments, is maintained by the registrar 160. In some embodiments, the linkage is checked without a database, e.g., by evaluating an eUICC identifier present in the device DLOA. Message 311 and event 313 in the message flow 400 are similar to those already described in message flow 300.

In the TEE case, the linkage to the eUICC can be established by an eUICC identifier in the device DLOA and verification of the device-eUICC pairing using a database.

Server Logic Flow, Including Database

Figure 5:
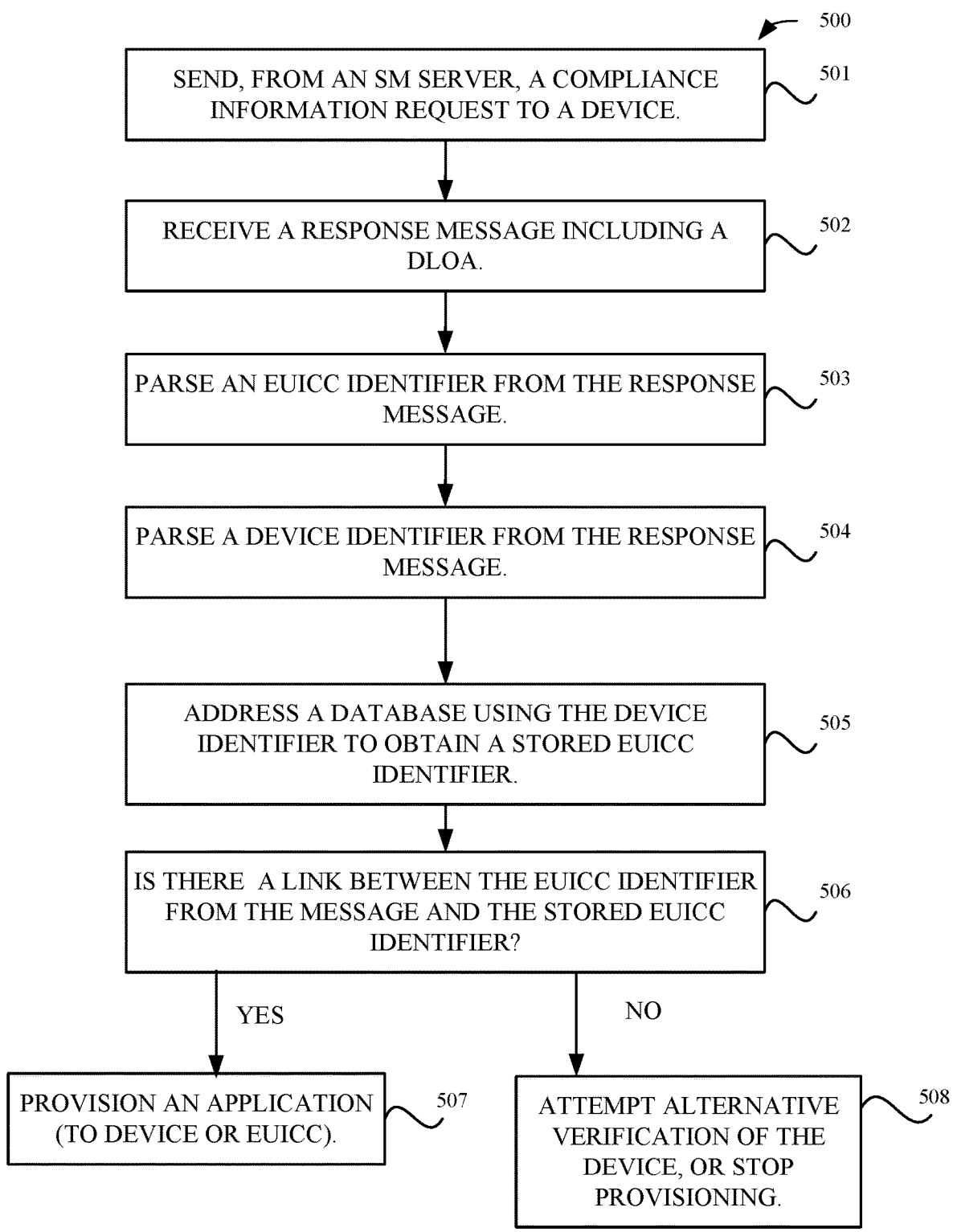
FIG. 5 illustrates exemplary logic performed by a server using a database to verify a received DLOA, according to some embodiments.

FIG. 5 illustrates exemplary logic 500 for using a device DLOA. At 501, an SM server sends a compliance information request to a device. At 502, the SM server receives a response message including a device DLOA. The SM server, at 503, parses an eUICC identifier from the response message. At 504, the SM server parses a device identifier from the response message. At 505, the SM server addresses a database using the device identifier to obtain a stored eUICC identifier. At 506, the SM server determines whether there is a link between the eUICC identifier from the message and the stored eUICC identifier obtained from the database. If there is a link, the logic flows to 507 and the SM server proceeds with provisioning an application to the device or to the eUICC. The target for provisioning (device or eUICC) is determined by the application type, in some embodiments. If there is no link, the logic flows to 508. At 508, the SM server may attempt an alternative verification of device compliance or may simply stop the provisioning process.

Device Logic Flow, Signed Information

Figure 6:
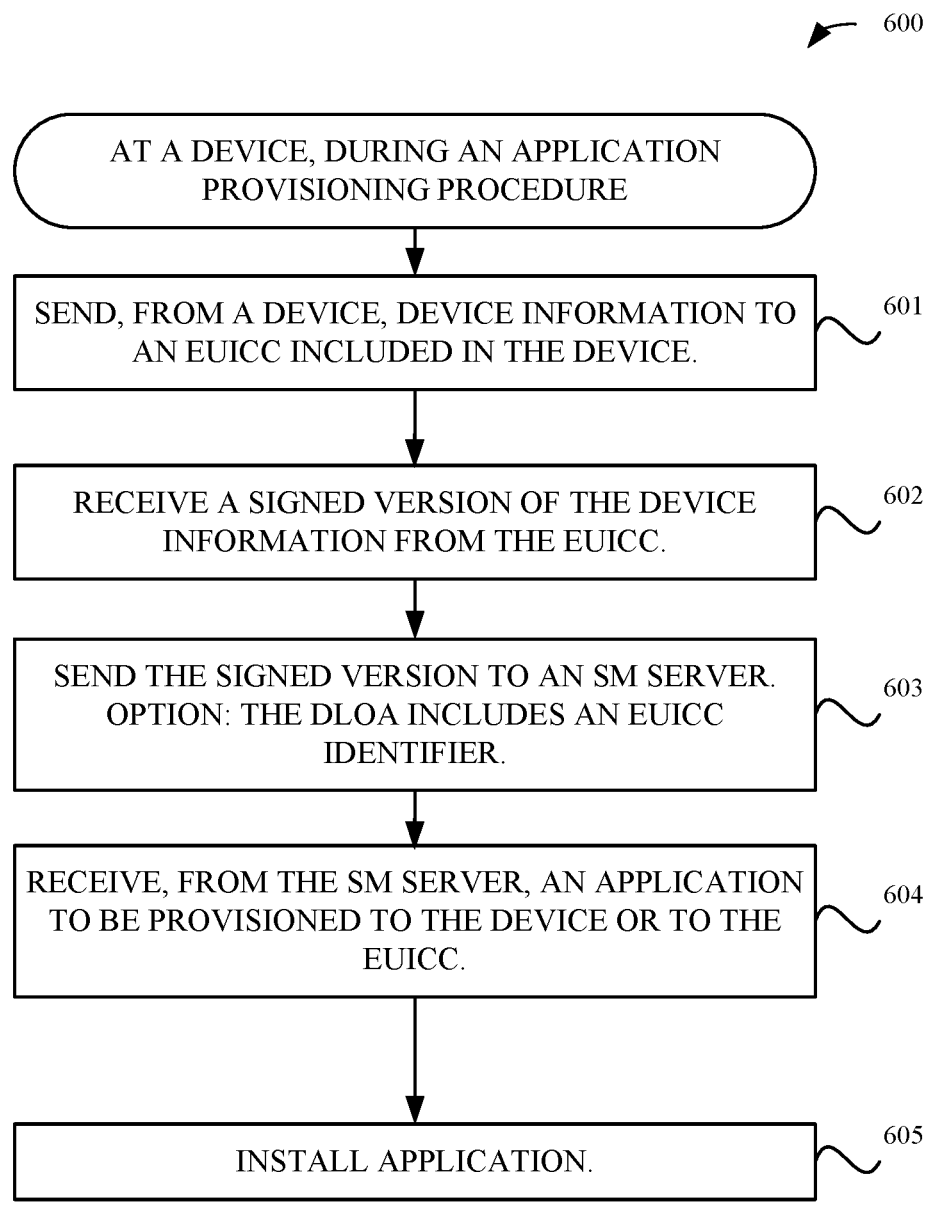
FIG. 6 illustrates exemplary logic performed by a device during an application provisioning, according to some embodiments.

FIG. 6 illustrates exemplary device logic 600 for application provisioning. At 601, the device sends device information to an eUICC embedded in the device. At 602, the device receives a signed version of the device information from the eUICC. In some embodiments, the device simply receives the signature. Because the device already includes the device information, in some embodiment the device information may not be sent by the eUICC. At 603 the device sends the signed device information to an SM server. In some embodiments, the DLOA includes an eUICC identifier, i.e., an identifier of the eUICC included in the device. Upon successful verification of the linkage of the device to the eUICC and of device compliance with RSP requirements for the application, the device receives at 604 an application to be provisioned to the device or to the eUICC. At 605, the device installs the application in the device or cooperates with the eUICC to install the application in the eUICC.

Server Logic Flow Using Database, eUICC Signs

Figure 7A:
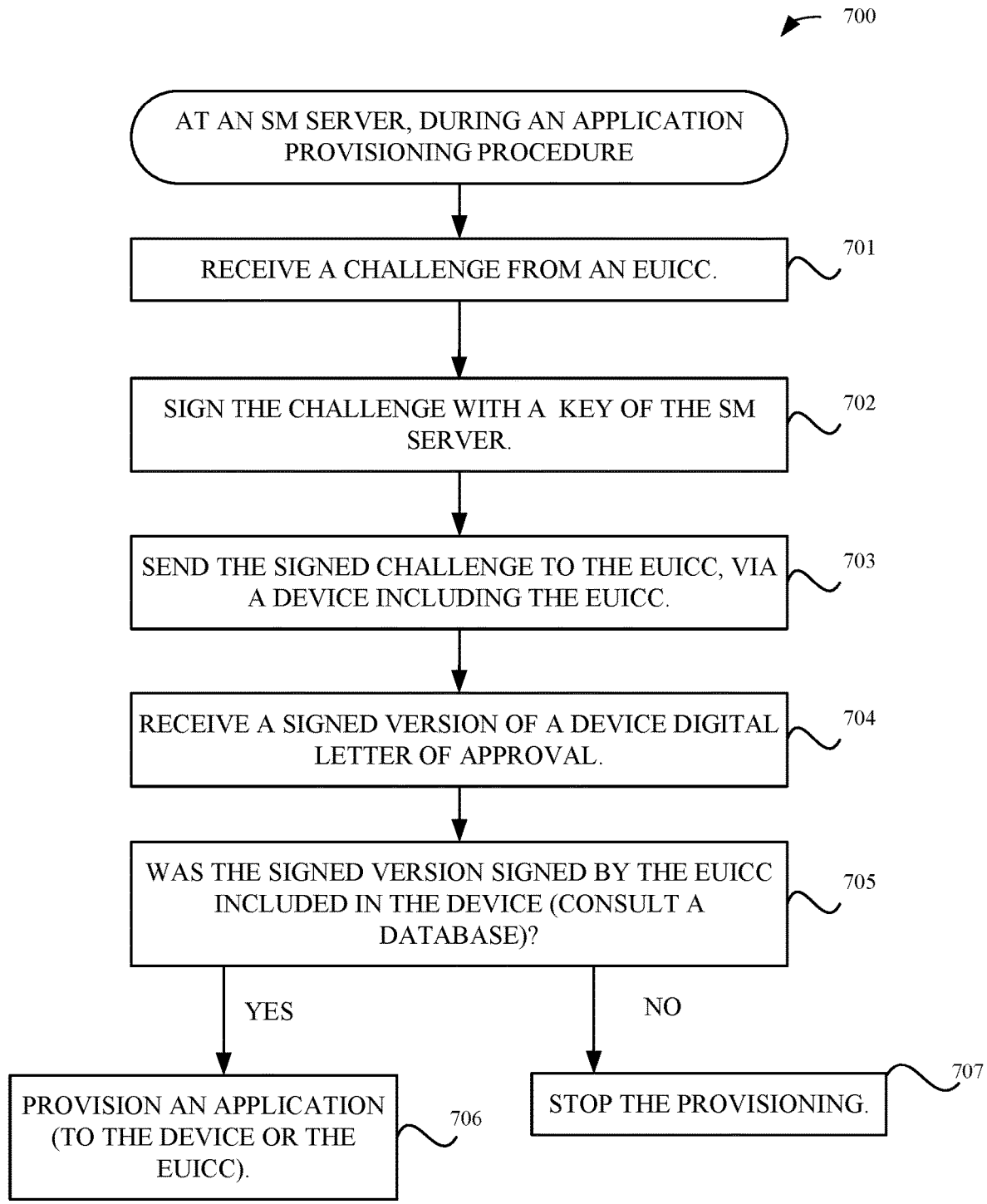
FIG. 7A illustrates exemplary logic performed by a server checking an eUICC signature during an application provisioning, according to some embodiments.

FIG. 7A illustrates exemplary server logic 700 for application provisioning. At 701, the SM server receives a challenge value, such as a nonce, from an eUICC included in a device. At 702, the SM server signs the challenge value with a key of the server, for example, a private key of a PKI public key-private key pair associated with the SM server. At 703, the SM server sends the signed challenge to the eUICC via the device. The device responds by sending a signed DLOA to the SM server and this is received at 704. At 705, the SM server determines whether the signed device DLOA was signed by an eUICC included in the device. The SM server consults a database indicating, for example, particular part identifier ranges (such as SKU ranges) of eUICCs installed in a given device production model type. If the device and the eUICC are linked, the logic flows to 706 and the SM server continues with the provisioning. If no linkage is established, the logic flows to 707. At 707 the SM server may seek an alternative device check or simply stops the provisioning process.

Server Logic Flow without Using a Database, eUICC Signs

Figure 7B:
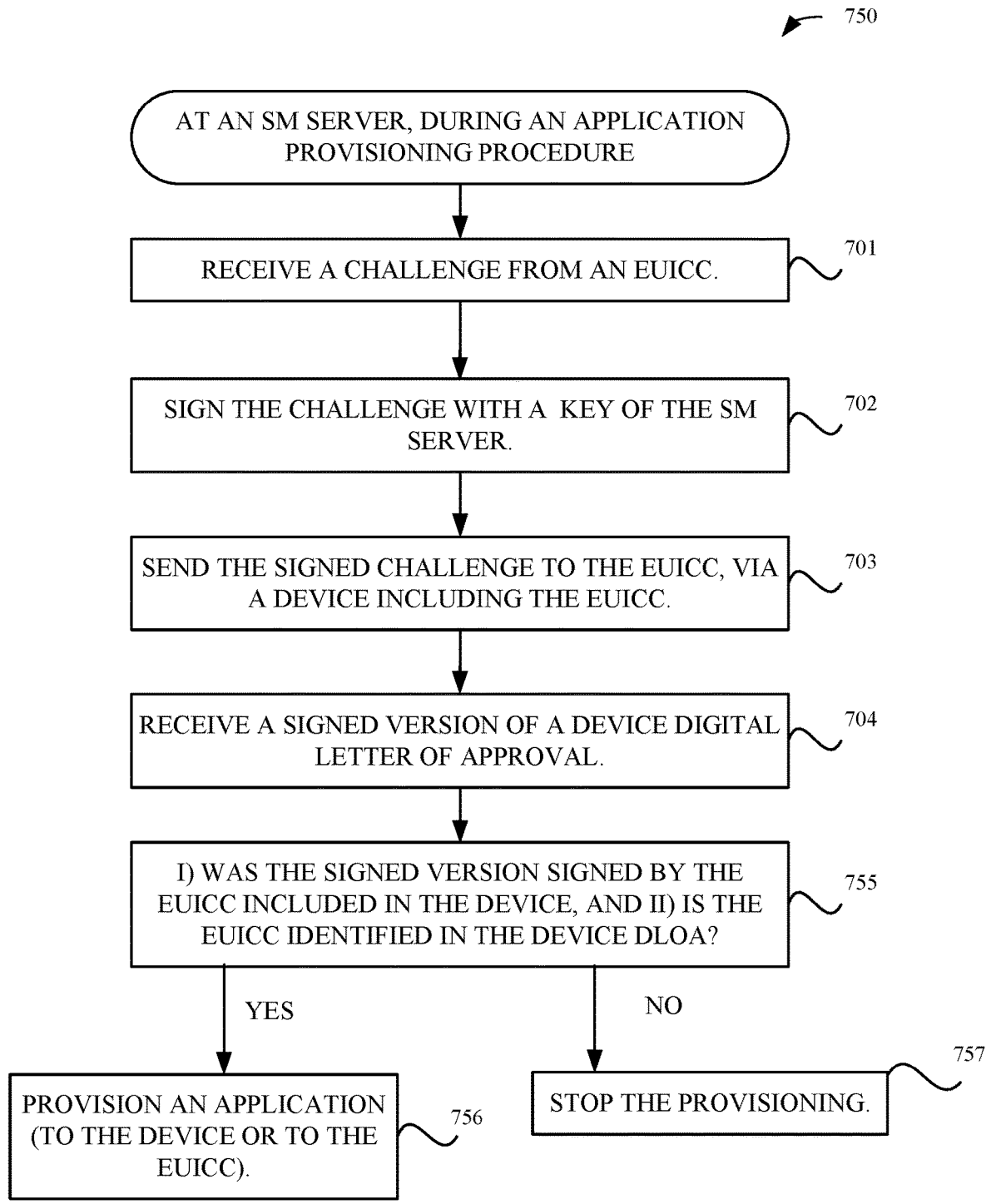
FIG. 7B illustrates alternative exemplary logic performed by a server checking an eUICC signature during an application provisioning, according to some embodiments.

FIG. 7B provides exemplary logic 750 similar to logic 700. The logic is the same through 704. After 704, at 755, the SM server determines whether: i) the signed version of the device information was signed by the eUICC ("signing eUICC") and ii) whether that signing eUICC is identified in the DLOA. 755 performs this determination of device/eUICC linkage without using a database. If the answer to both of the inquiries at 755 is yes, then the logic flows to 756 and the provisioning continues. If the answer to either is no, then the logic flows to 757. At 757 the SM server may seek an alternative device check or simply stop the provisioning process.

Message Flow for Device Signing Operations; Device's Own Root of Trust

Figure 7C:
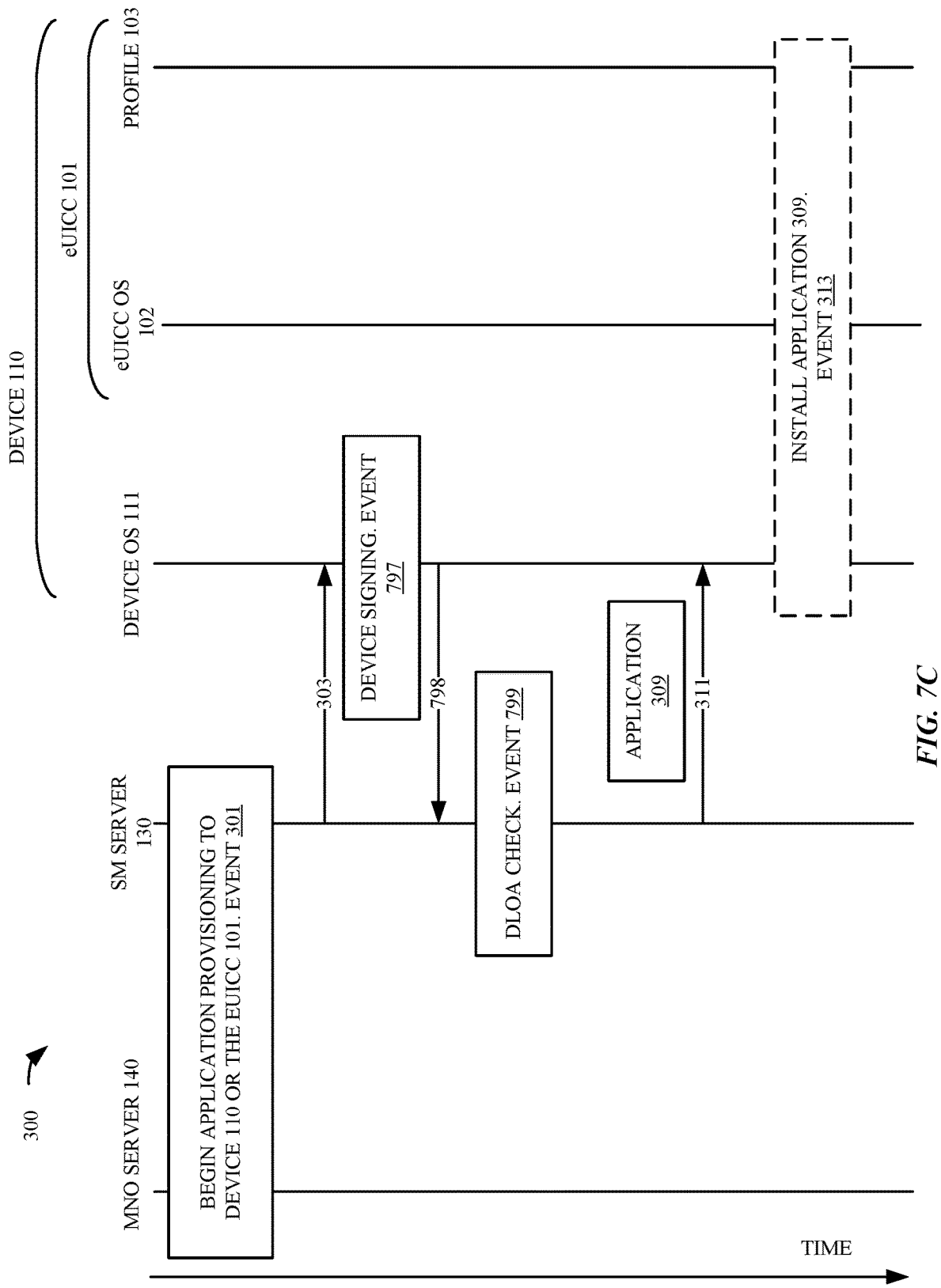
FIG. 7C illustrates an alternative exemplary message flow for checking device eligibility in which the device performs a signature operation, according to some embodiments.

In some embodiments, there is no dependency between the device 110 and the eUICC 101 for authentication of a DLOA. This provides an advantage in certifying device compliance by, for example, not relying on a central database linking a device with an eUICC. A device providing its own root of trust is also useful because it is applicable for removable SEs (e.g., an eUICC-capable device that accepts only plug-in form factor eUICC on a 4FF card). This disclosure provides device certificate and ID-based encryption embodiments for a device with its own root of trust. FIG. 7C includes a device signing event 797, a message 798 providing a signed DLOA to the SM server 130 and a DLOA check event 799. Otherwise, the events and messages of FIG. 7C are similar to those of FIG. 3.

Figure 7D:
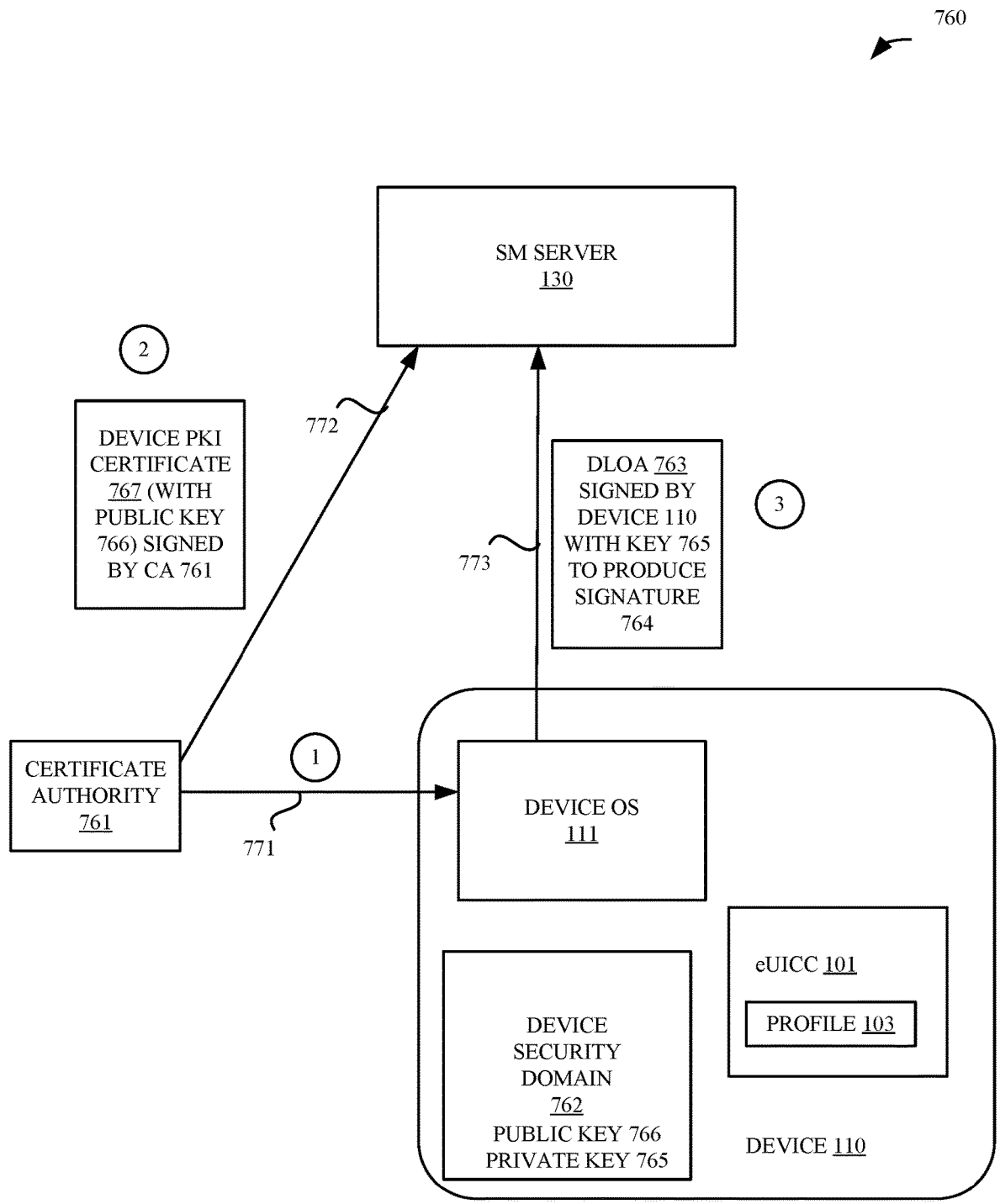
FIG. 7D illustrates an alternative exemplary system in which the device performs a signature operation associated with a certificate, according to some embodiments.

FIG. 7D illustrates a system 760 including the SM server 130, the device 110, and a certificate authority (CA) 761. A timing relationship of events is indicated with the circled numbers 1, 2, and 3 next to the arrows labeled 771, 772, and 773. That is, 771 occurs first, then 772, then 773 at some later time. Arrow 771 corresponds to establishment of a public key-private key pair (public key 766, private key 765) associated with the device 110. The device 110 provides security for protecting its private keys. This security can include secure booting operations, secure storage and application sandbox features. These security features are indicated by the device security domain 762 in FIG. 7D. There are many ways to establish public key-private key pairs. The arrow 771 simply indicates that CA 761 has authenticated the device 110 and issued a signed certificate 767 vouching for the public key 766 being associated with the device 110. The arrow 772 corresponds to the CA 761 providing a copy of the certificate 767 to the SM server 130 as needed.

After the SM server sends message 303 of FIG. 7C, the device 110 performs a DLOA signing event 797. The arrow 773 of FIG. 7D corresponds to message 798 of FIG. 7C in which the device 110 supplies the signed DLOA 763 to the SM server 130. In some embodiments, the DLOA 763 is signed by the device 110 with the private key 765 to produce a signature 764. The SM server 130 is in possession, or obtains possession, of the PKI certificate 767 of the device 110. At event 799 of FIG. 7C, the SM server is able to verify the received DLOA 763 by using the public key 766 of the device 110. The SM server trusts the result of verification using the public key 766 because the CA 761 has provided PKI certificate 767 binding the public key 766 to an identity of the device 110. Subsequent provisioning events in FIG. 7C are the same as in FIG. 3.

Figure 7E:
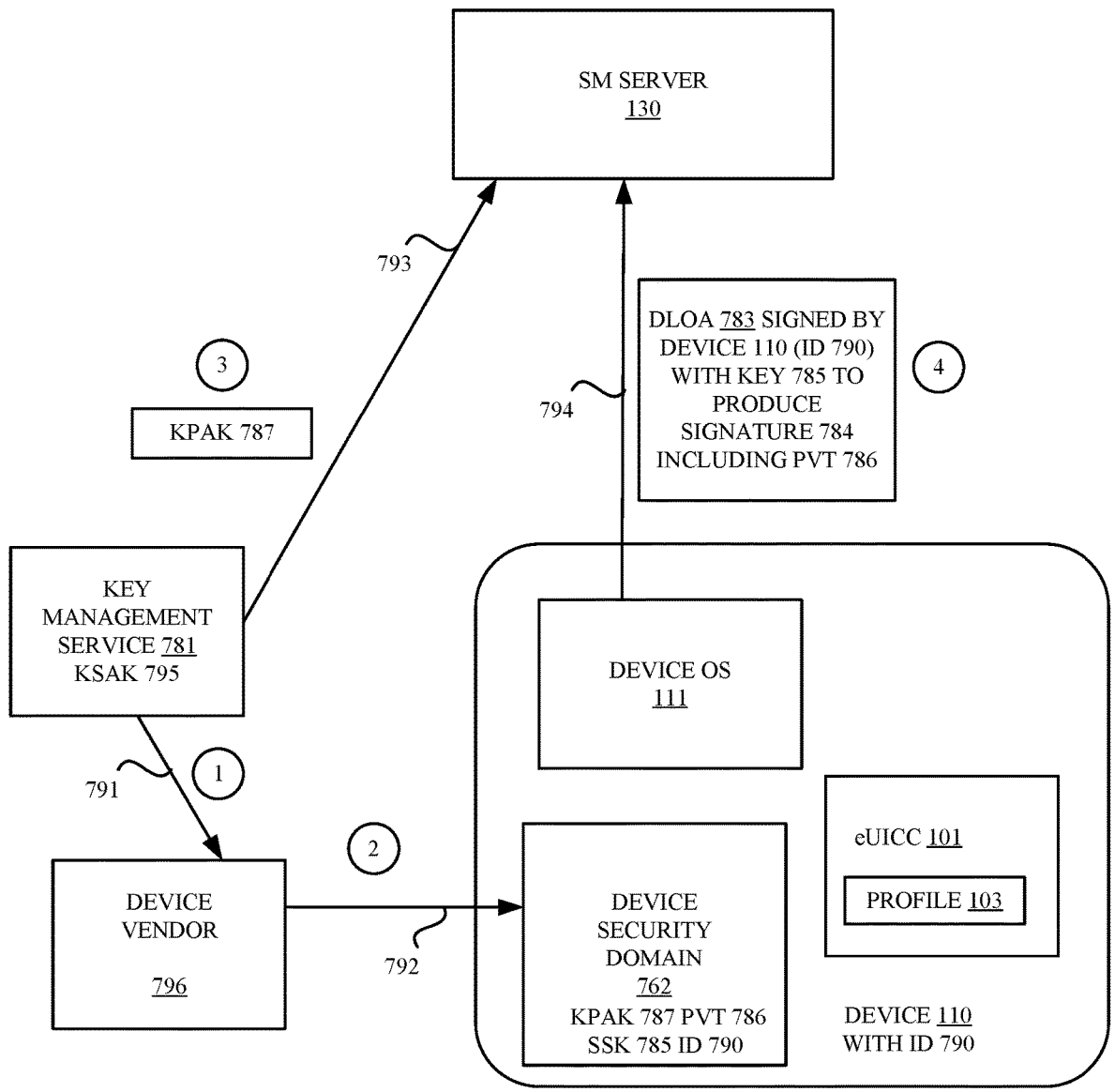
FIG. 7E illustrates an alternative exemplary system in which the device performs a signature operation associated with a public authentication key, according to some embodiments.

In an alternative embodiment illustrated by the system 780 in FIG. 7E, the SM server 130 verifies a DLOA 783 without a certificate. Arrows 791, 792, 793 occur in sequence as shown by the circled numbers 1, 2, and 3. Arrow 794 occurs some time later (circled number 4). The device 110 has an identifier (ID) 790 known to the SM server 130 and the key management service (KMS) 795. The KMS chooses a secret authentication key 795 (KSAK) in advance. The KMS derives a KMS public authentication key KPAK 787. KPAK 787 is distributed to the device 110 and the SM server 130 (arrows 792, 793). The KMS 781 generates and provisions the key material secret signing key SSK 785 and public validation token PVT 786 to the device 110 (via the device vendor 796, arrow 792). In FIG. 7C, after the SM server 130 requests the DLOA of the device with the message 303, the device performs a signing event 797. In FIG. 7D, this event 791 is supported by a certificate. In FIG. 7E, this event 791 is certificateless. The device 110 then provides the signed DLOA with message 798 of FIG. 7C. Message 798 corresponds to arrow 794 and encircled number 4 of FIG. 7E. The signature 784 sent to the SM server 130 includes the device 110 ID 790. The SM server 130 then performs DLOA check event 799 of FIG. 7C including verifying the signature 784 of the device 110 using the signature 784, the ID 790, and the KPAK 787.

The KMS 781 distributes the KPAK 787 to the SM server 130 as shown by the arrow 793. In general the arrow 793 indicates that the SM server 130 has an interface for secure communication with the KMS 781.

Further details of identity-based authentication can be found in RFC 6507 "Elliptic Curve-Based Certificateless Signatures for Identity-Based Encryption (ECCSI)" published by the IETF and dated February 2012.

eUICC Details

Figure 8:
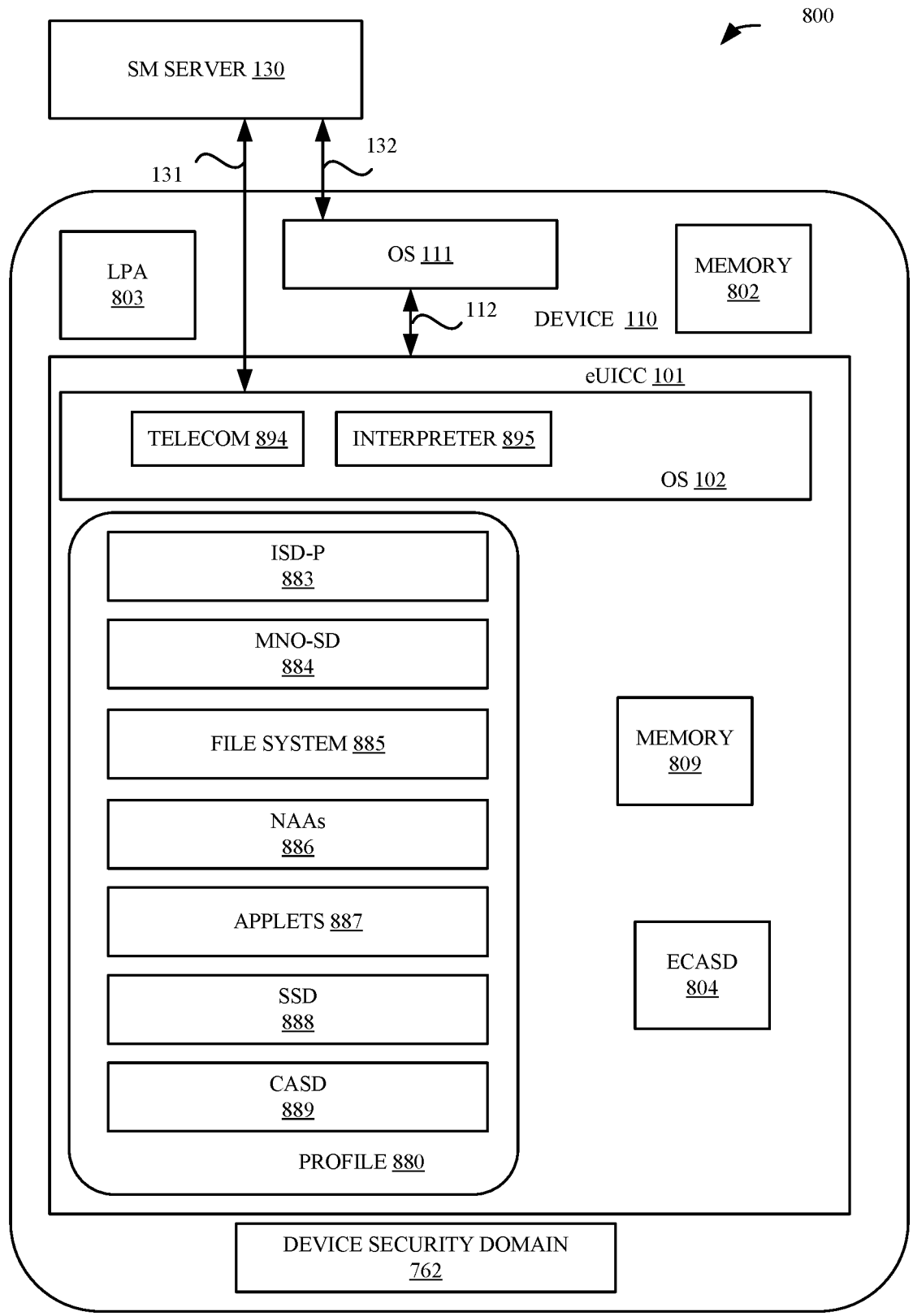
FIG. 8 illustrates exemplary details of an eUICC and a profile, according to some embodiments.

FIG. 8 illustrates a system 800 with details of the eUICC 101 including a profile 880. Profile 880 is exemplary of profile 103 of FIG. 1. The eUICC 101 includes the operating system 102. Within the operating system 102 is a telecom framework 894, which provides authentication algorithms to network access applications (such as NAAs 886). Interpreter 895 translates profile content package data into an installed profile content using a specific internal format of the eUICC 101. ISD-P 883 hosts the profile 880. The ISD-P is a secure container (security domain) for the hosting of the profile 880. An ISD-R (not shown) on the eUICC 101 is responsible for the creation of new ISD-Ps on the eUICC 101 and the lifecycle management of all ISD-Ps on the eUICC 101. ECASD 804 provides secure storage of credentials required to support the security domains on eUICC 101. In some embodiments, the eUICC 101 includes additional memory 809. MNO-SD 884 is the representative on the eUICC 101 of the operator providing services via the profile 880 to the end user 120. In some embodiments, the profile 880 includes a file system 885, applets 887, and/or an SSD 888. In some embodiments, such as described with respect to device signing in FIGS. 7C, 7D, and 7E, the device 110 includes security features such as those represented by device security domain 762. In some embodiments, the device 110 includes a memory 802.

Example Device Connections

Figure 9:
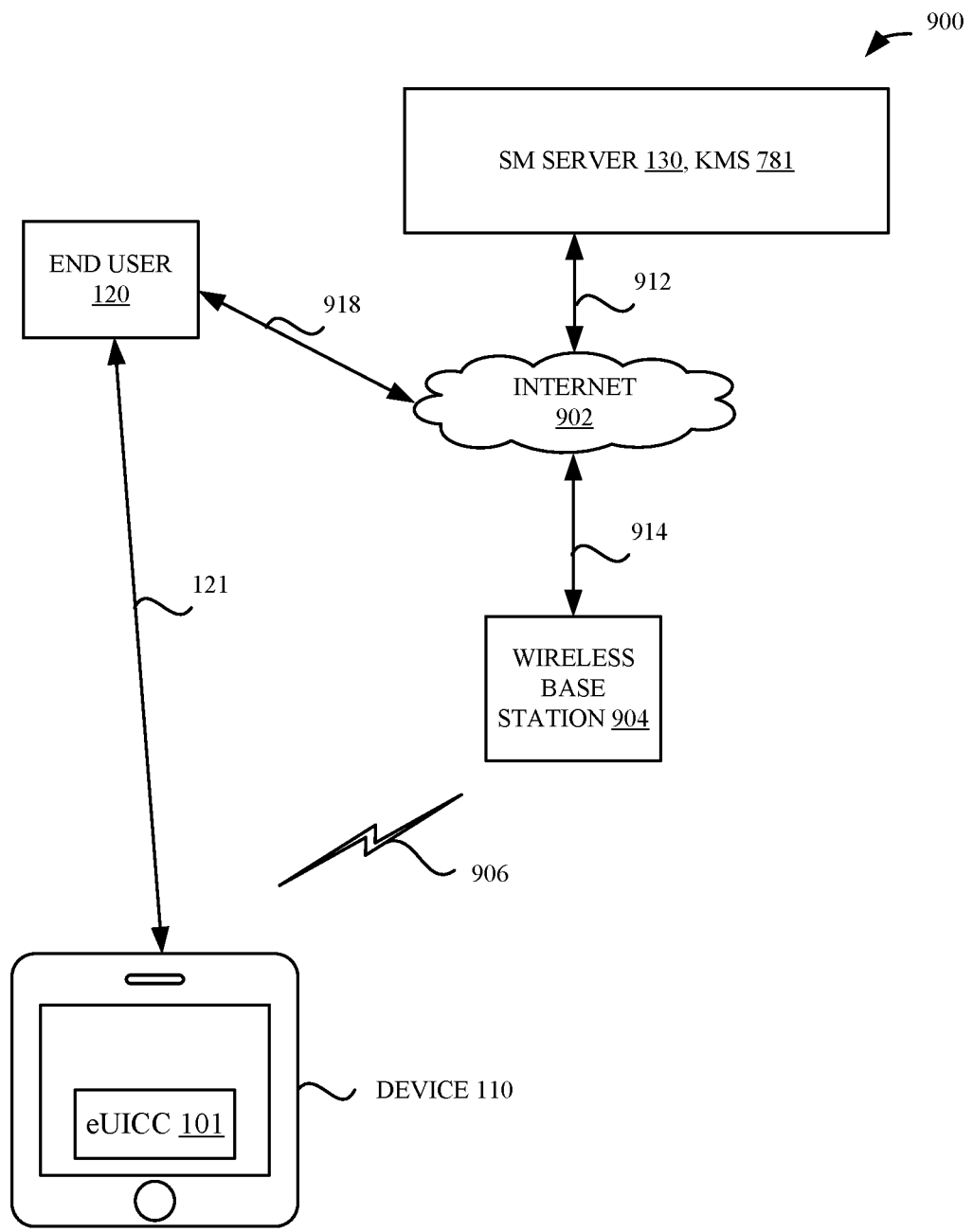
FIG. 9 illustrates exemplary network connections of entities described herein, according to some embodiments.

FIG. 9 illustrates example connection methods for profile content management in a system 900. End user 120 can manage device 110 using interface 121 which can convey end user actions such as requesting a profile content update. The end user 120 can also remotely manage device 110 via the Internet 902 using interface 918. The device 110 is shown connected to a wireless base station 904. The wireless base station 904 communicates with the device 110 via a wireless link 906. The wireless base station 904 can be an Institute of Electronic and Electrical Engineers 802.11 Wireless Fidelity (IEEE 802.11 Wi-Fi) access point (AP) or the wireless base station 904 can be, for example, a cellular mobile network base station. The wireless base station 904 can connect with the Internet 902 via interface 914. The SM server 130 and/or the KMS 781 can connect with the Internet 902 via interface 912. Examples of cellular mobile network base stations are a 2G or 3G base station or an LTE eNode B. After successful installation of an application based on the device DLOA, the user 120 can enjoy use of the application.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 10:
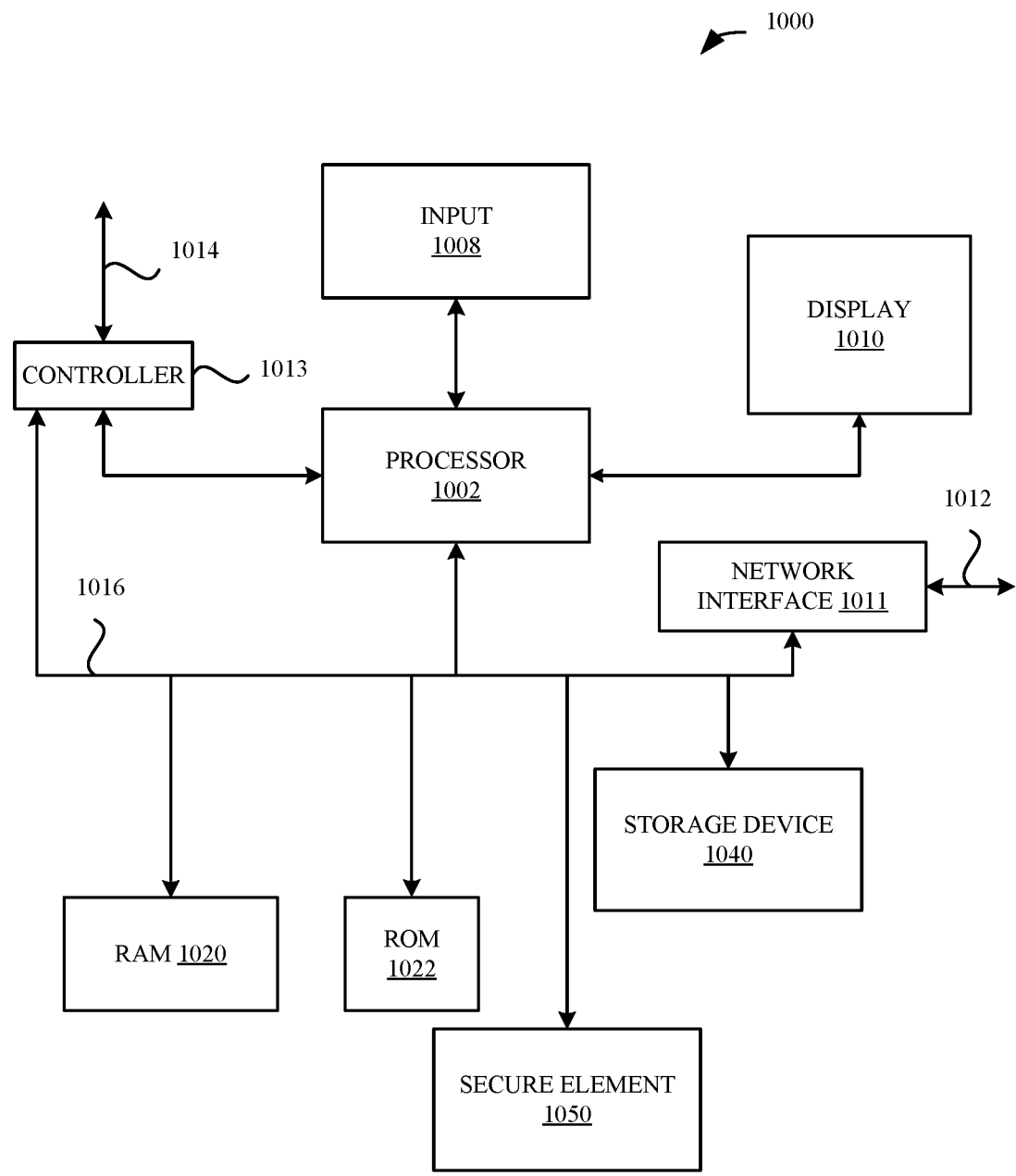
FIG. 10 illustrates an exemplary apparatus for implementation of the embodiments disclosed herein, according to some embodiments.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in one or more of the device 110, or the SM server 130 illustrated in FIG. 1. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000. The computing device 1000 can also include a secure element 1050.

Representative Embodiments

In some embodiments, a method of provisioning an application to a device by a subscription manager (SM) server includes: (i) sending a message including a compliance information request to the device, where the device includes an embedded universal integrated circuit card (eUICC); (ii) receiving a response message including a digital letter of approval (DLOA) from the device; (iii) parsing a first eUICC identifier from the response message; (iv) parsing a device identifier from the response message; (v) addressing a database using the device identifier to obtain a second eUICC identifier value; (vi) performing a comparison of the first eUICC identifier and the second eUICC identifier; (vii) provisioning the application to the device or to the eUICC via the device, when the comparison indicates a link between the first eUICC identifier and the device identifier; and (viii) attempting an alternative verification of the device, when the comparison fails to associate the first eUICC identifier with the device.

In some embodiments, the first eUICC identifier includes an embedded secure element (eSE) identifier. In some embodiments, the first eUICC identifier includes an eUICC/eSE platform label. In some embodiments, the DLOA includes the first eUICC identifier in an eUICC platform label field. In some embodiments, the eUICC platform label field provides a root of trust for the DLOA. In some embodiments, the eUICC is associated with a public key infrastructure (PKI) certificate, and the response message includes a copy of the PKI certificate. In some embodiments, the database provides the second eUICC identifier based on a mapping of the device identifier to an eUICC embedded in the device. In some embodiments, the database provides associations between a first set of device DLOAs with a second set of eUICC/eSE DLOAs. In some embodiments, the database provides associations between eUICC/eSE platform labels in device DLOAs with platform labels in eUICC/eSE DLOAs. In some embodiments, the database is maintained by a registrar. In some embodiments, the DLOA is issued by an authority. In some embodiments, the authority is a public key infrastructure (PKI) certificate authority.

In some embodiments, a method of provisioning an application to a device by a subscription manager (SM) server includes: (i) receiving a challenge from an embedded universal integrated circuit card (eUICC) via the device that includes the eUICC; (ii) signing the challenge with a key of the SM server; (iii) sending the signed challenge to the device; (iv) receiving a signed version of a device DLOA; (v) performing a verification of the signed version of the device DLOA; (vi) proceeding with provisioning of the application from the SM server to the eUICC or to the device, when the verification indicates that the signed version of the device DLOA was signed with a key of the eUICC; and (vii) not proceeding with provisioning of the application from the SM server to the eUICC, when the verification indicates that the signed version of the device DLOA was not signed with a key of the eUICC.

In some embodiments, a method of obtaining an application, from a subscription manager (SM) server, by a device that includes an embedded universal integrated circuit card (eUICC) includes: (i) sending device information to the eUICC; (ii) receiving a signed version of the device information from the eUICC; (iii) sending the signed version of the device information to the SM server; and (iv) receiving, responsive to the sending the signed version of device information, the application from the SM server to be provisioned to the eUICC or to the device.

In some embodiments, the device receives the application in a bound profile package (BPP). In some embodiments, the BPP includes a signature of the SM server binding the BPP to the eUICC. In some embodiments, the device information includes a device digital letter of approval (DLOA). In some embodiments, the device information includes a DeviceInfo object. In some embodiments, the sending the signed version is part of a remote subscriber identity module (SIM) provisioning (RSP) authentication procedure. In some embodiments, the device information includes a reference to the eUICC. In some embodiments, the reference includes an identifier of the eUICC. In some embodiments, the method further includes: (v) receiving a challenge from the eUICC; (vi) sending the challenge to a subscription manager (SM) server; and (vii) receiving a signed challenge from the SM server.

In some embodiments, a method by a device, which includes an embedded universal integrated circuit card (eUICC), includes the device: (i) receiving a request for a digital letter of approval (DLOA); (ii) signing the DLOA using a private key of a public key-private key pair of the device to produce a signed DLOA; (iii) sending the signed DLOA to the SM server; and (iv) receiving, responsive to the sending the signed DLOA, an application from the SM server to be provisioned to the eUICC or to the device. In some embodiments, the device is configured with secure boot, secure storage, application security sandbox features. In some embodiments, the method further includes the device sending a certificate signed by a certificate authority (CA) to the SM server, where the certificate includes the public key.

In some embodiments, a method by a device, which includes an embedded universal integrated circuit card (eUICC), includes the device: (i) receiving a request for a digital letter of approval (DLOA); (ii) signing the DLOA using a secret signing key (SSK) to produce a signed DLOA, wherein the device is associated with the SSK, a public validation token (PVT) and the SSK is associated with a device identifier (ID); (iii) sending the signed DLOA to the SM server; and (iv) receiving, responsive to the sending the signed DLOA, an application from the SM server to be provisioned to the eUICC or to the device.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of obtaining an application by a device from a subscription manager (SM) server, the method comprising:
   by the device, which includes an embedded universal integrated circuit card (eUICC):
      sending, to the eUICC, device information including:
         a device identifier, and
         a device digital letter of approval (DLOA) including an eUICC identifier;
      receiving a signed version of the device information from the eUICC;
      sending the signed version of the device information to the SM server; and
      receiving, responsive to the sending the signed version of the device information and after successful verification by the SM server of a linkage between the device and the eUICC, the application from the SM server to be provisioned to the eUICC or to the device,
      wherein inclusion of the device identifier and the eUICC identifier in the device information allows the SM server to verify the linkage between the device and the eUICC before sending the application to the device.

2. The method of claim 1, wherein:
   the device receives the application in a bound profile package (BPP), and
   the BPP includes a signature of the SM server binding the BPP to the eUICC of the device.

3. The method of claim 1, wherein inclusion of the eUICC identifier in the device information allows the SM server to further verify a signature of the signed version of the device information corresponds to the eUICC identified by the eUICC identifier included in the DLOA.

4. The method of claim 1, wherein the device information includes a DeviceInfo object.

5. The method of claim 1, wherein the sending the signed version of the device information is part of a remote subscriber identity module (SIM) provisioning (RSP) authentication procedure.

6. The method of claim 1, further comprising, prior to the sending the device information to the eUICC:
   receiving a challenge from the eUICC;
   sending the challenge to the SM server; and
   receiving a signed challenge from the SM server.

7. A device configured for obtaining an application from a subscription manager (SM) server, the device comprising:
   one or more antennas;
   an embedded universal integrated circuit card (eUICC); and
   at least one processor communicatively coupled to the one or more antennas, the eUICC, and
      a memory storing instructions that, when executed by the at least one processor,
      cause the device to perform a method that includes steps of:
         sending, to the eUICC, device information including:
            a device identifier, and
            a device digital letter of approval (DLOA) including an eUICC identifier;
         receiving a signed version of the device information from the eUICC;
         sending the signed version of the device information to the SM server; and
         receiving, responsive to the sending the signed version of the device information and after successful verification by the SM server of a linkage between the device and the eUICC, the application from the SM server to be provisioned to the eUICC or to the device,
         wherein inclusion of the device identifier and the eUICC identifier in the device information allows the SM server to verify the linkage between the device and the eUICC before sending the application to the device.

8. The device of claim 7, wherein:
   the device receives the application in a bound profile package (BPP), and
   the BPP includes a signature of the SM server binding the BPP to the eUICC of the device.

9. The device of claim 7, wherein inclusion of the eUICC identifier in the device information allows the SM server to further verify a signature of the signed version of the device information corresponds to the eUICC identified by the eUICC identifier included in the DLOA.

10. The device of claim 7, wherein the device information includes a DeviceInfo object.

11. The device of claim 7, wherein the sending the signed version of the device information is part of a remote subscriber identity module (SIM) provisioning (RSP) authentication procedure.

12. The device of claim 7, further comprising, prior to the sending the device information to the eUICC:
   receiving a challenge from the eUICC;
   sending the challenge to the SM server; and
   receiving a signed challenge from the SM server.

13. A non-transitory computer readable medium storing instructions that when executed by a processor of a device, configures the device to:

send, to an embedded universal integrated circuit (eUICC) included in the device, device information including:
  a device identifier, and
  a device digital letter of approval (DLOA) including an eUICC identifier;
receive a signed version of the device information from the eUICC;
send the signed version of the device information to a subscription manager (SM) server; and
receive, responsive to the sending the signed version of the device information and after successful verification by the SM server of a linkage between the device and the eUICC, an application from the SM server to be provisioned to the eUICC or to the device,
wherein inclusion of the device identifier and the eUICC identifier in the device information allows the SM server to verify the linkage between the device and the eUICC before sending the application to the device.

14. The non-transitory computer readable medium of claim 13, wherein:
  the device receives the application in a bound profile package (BPP), and
  the BPP includes a signature of the SM server binding the BPP to the eUICC of the device.

15. The non-transitory computer readable medium of claim 13, wherein inclusion of the eUICC identifier in the device information allows the SM server to further verify a signature of the signed version of the device information corresponds to the eUICC identified by the eUICC identifier included in the DLOA.

16. The non-transitory computer readable medium of claim 13, wherein the device information includes a DeviceInfo object.

17. The non-transitory computer readable medium of claim 13, wherein the device is further configured to, prior to sending the device information to the eUICC:
  receive a challenge from the eUICC;
  send the challenge to the SM server; and
  receive a signed challenge from the SM server.

18. The non-transitory computer readable medium of claim 13, wherein the signed version of the device information is sent to the SM server as part of a remote subscriber identity module (SIM) provisioning (RSP) authentication procedure.

* * * * *